United States Patent
Varada et al.

(10) Patent No.: US 9,904,718 B2
(45) Date of Patent: Feb. 27, 2018

(54) SYSTEM AND METHOD FOR STREAMING EVENTS IN A TRANSACTION-BASED SYSTEM

(71) Applicant: Wal-Mart Stores, Inc., Bentonville, AR (US)

(72) Inventors: Gautham Varada, Bangalore (IN); Suyog Barve, Bentonville, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 667 days.

(21) Appl. No.: 13/886,781

(22) Filed: May 3, 2013

(65) Prior Publication Data

US 2014/0279841 A1  Sep. 18, 2014

Related U.S. Application Data

(60) Provisional application No. 61/779,330, filed on Mar. 13, 2013.

(51) Int. Cl.
  *G06F 7/00* (2006.01)
  *G06F 17/00* (2006.01)
  *G06F 17/30* (2006.01)

(52) U.S. Cl.
  CPC .............................. *G06F 17/30575* (2013.01)

(58) Field of Classification Search
  None
  See application file for complete search history.

(56) References Cited

U.S. PATENT DOCUMENTS

| | | | |
|---|---|---|---|
| 6,879,995 B1 * | 4/2005 | Chinta | H04L 67/24 709/204 |
| 8,195,722 B1 * | 6/2012 | Havemose | G06F 17/30144 707/821 |
| 8,738,650 B2 | 5/2014 | Bawa et al. | |
| 9,363,282 B1 | 6/2016 | Yu et al. | |
| 2002/0038289 A1 | 3/2002 | Lawlor et al. | |
| 2005/0119992 A1 | 6/2005 | Martino | |
| 2006/0190504 A1 * | 8/2006 | Pruet, III | G06F 17/30362 |
| 2008/0222159 A1 * | 9/2008 | Aranha | G06F 17/30289 |
| 2009/0138336 A1 * | 5/2009 | Ashley, Jr. | G01S 5/0289 455/456.1 |
| 2011/0125854 A1 | 5/2011 | Macken | |
| 2012/0130940 A1 | 5/2012 | Gattani et al. | |
| 2013/0006949 A1 * | 1/2013 | Essawi | G06F 21/552 707/703 |
| 2013/0080239 A1 * | 3/2013 | Okerlund | G06Q 30/0226 705/14.33 |

(Continued)

OTHER PUBLICATIONS

ISR; PCT/US14/24400; Aug. 1, 2014.

(Continued)

*Primary Examiner* — Tjau-Shya Meng
(74) *Attorney, Agent, or Firm* — McCarter & English, LLP; David R. Burns

(57) ABSTRACT

A system is provided that permits events to be propagated between systems in near real time for the purpose of ensuring consistency in a transaction-based environment. In one implementation, transactions are streamed between systems using a lightweight protocol shortly after they are processed, rather than being communicated in a one-way batch mode as is typically done in conventional retail store systems.

20 Claims, 9 Drawing Sheets

(56) References Cited

U.S. PATENT DOCUMENTS

2013/0244614 A1* 9/2013 Santamaria ............. H04L 51/04
 455/411
2014/0358982 A1 12/2014 Pareek et al.
2016/0085399 A1 3/2016 Jain et al.

OTHER PUBLICATIONS

DataStax Enterprise Analytics—Real Time & Batch Analytics, Build Intelligent Applications, http://www.datastax.com/products/datastaxenterpriseanalytics, last viewed Nov. 14, 2016.

DataMetica's Solution for Real-Time Anlalytics, http://datametica.com/datameticassolutionforrealtimeanalytics/, last viewed Nov. 14, 2016.

Apache Kafka with Spark Streaming: Real Time Analytics Redefined, http://www.edureka.co/blog/webinars/apachekafkawithsparkstreamingrealtimeanalyticsredefined/, last viewed Nov. 14, 2016.

Elumalai, Babu, AWS Big Data Blog, Real-time in-memory OLTP and Analytics with Aapche Ignite on AWS, https://aws.amazon.com/blogs/bigdata/realtimeinmemoryoltpandanalyticswithapacheigniteonaws/, last viewed Nov. 14, 2016.

\* cited by examiner

SYSTEM AND METHOD FOR STREAMING EVENTS IN A TRANSACTION-BASED SYSTEM

CROSS-REFERENCE TO RELATED APPLICATIONS

This application claims priority under 35 U.S.C. § 119(e) to U.S. Provisional Application Ser. No. 61/779,330 entitled "SYSTEM AND METHOD FOR STREAMING EVENTS IN A TRANSACTION-BASED SYSTEM," filed Mar. 13, 2013, of which application is herein incorporated by reference in its entirety.

BACKGROUND

There are many different methods for performing transactions within a financial system. For instance, there are a number of disparate systems that store commercial transactions that are performed in a variety of store locations.

SUMMARY

According to one aspect, it is appreciated that many of the systems are not updated in real time with information from various store locations. For instance, the user may, when accessing a commercial website, desire to locate a particular item is sold at a retail store location. However, because the website is unable to accurately determine how many items are located at the commercial retail location, the website may process one or more transactions based on incorrect business knowledge at the time of the transaction. Many of the systems that are used to perform transactions are not easily connected, and do not communicate in real time. Frequently, information such as pricing, availability, sales, items on hand, among other information is communicated in a batch mode (e.g., at the end of a sales day). Such information is typically communicated one-way between a store to a home office. It is appreciated that some of these data elements are hours or days old, and the staleness of this data may cause consistency issues for applications and services in a multichannel ecosystem.

Therefore, it would be beneficial for many of these disparate systems to have the capability of updating each other in real time or near real time, with transaction information as they occur. According to one aspect of the present invention, a mechanism is provided to efficiently stream events in near real time from or more sources to one or more central/regional event stores. The event source could be an application, database, file system, a database, file system, memory or any other type of event source. In one embodiment, a distributed system is provided that provides the capability of transmitting events from stores and data centers as events occur in those subsystems. In one implementation, these events are lightweight and are streamed in near real time. Such a capability enables provisioning consistent data across multiple channels for Online Transaction Processing (OLTP) and analytical applications.

According to one embodiment of the present invention, event source components are added to legacy systems, allowing those systems to source events in a real-time manner. In this way, recoding of existing systems is minimized, and interfaces are provided for sending and receiving transaction events.

According to another embodiment of the present invention, an ability may be provided to stream data from multiple data sources to a central location. In another embodiment, a system may be provided to source multiple types of events such as file-based, database, and other event types in a number of different protocols to a data sink. Further, a buffering capability is provided in the case in particular data target is unavailable. Also in another implementation, and ability may be provided for managing and monitoring data sources and target from a central location. In yet another implementation, open source components may be used to construct all or part of the distributed system.

According to one aspect of the present invention, a distributed system is provided comprising one or more distributed systems, each of the distributed systems including an event generator, the event generator being adapted to stream transaction events occurring in real time, and a central manager comprising an event receiver, the event receiver being adapted to receive one or more streams of transactions from the one or more distributed systems and commit the streams of transactions to one or more databases wherein the event generator of at least one of the one more distributed systems comprises an event emitter that creates one or more events based on one or more transactions that occur at a location associated with the at least one distributed system.

According to one embodiment of the present invention, the event generator further comprises a plurality of event sources that receive the created one or more events and generates a stream of transaction events. According to another embodiment, the stream of transaction events are communicated to the event receiver of the central manager. According to another embodiment, the plurality of event sources comprises a UDP event source that is capable of transmitting UDP events to a UDP event receiver of the central manager. In yet another embodiment, the plurality of event sources comprises a TCP event source that is capable of transmitting TCP events to a TCP event receiver of the central manager. In another embodiment, the plurality of event sources comprises a file event source that is capable of transmitting file events to a file event receiver of the central manager. In another embodiment, the plurality of event sources comprises a database event source that is capable of transmitting database events to a database event receiver of the central manager.

According to another embodiment, the event generator is adapted to receive a locally-committed event and stream the locally-committed event to the central manager in real time. According to another embodiment, the one or more distributed systems are located in one or more commercial store locations, and wherein the one or more distributed systems are adapted to process events associated with transactions occurring at the one or more commercial store locations. According to another embodiment, the central manager is adapted to communicate information associated with the one or more streams of transactions to one or more external systems.

According to another embodiment, the central manager is adapted to receive transactions from the one or more external systems. According to another embodiment, the central manager is adapted to update a website with real-time information associated with the one or more commercial store locations.

According to another aspect of the present invention, a method is provided for processing events in a distributed system, the method comprising acts of generating, by an event generator of at least one system in a distributed system network, a stream of transaction events occurring in real time, receiving, by an event receiver of a central manager, one or more streams of transactions from the one or more distributed systems and committing the streams of transactions to one or more databases, and creating, by an event emitter of the at least one system in the distributed system one or more events based on one or more transactions that occur at a location associated with the at least one distributed system.

According to one embodiment of the present invention, the method further comprises an act of receiving, by a plurality of event sources, the created one or more events and generating a stream of transaction events. In another embodiment, the method further comprises an act of communicating the stream of transaction events to the event receiver of the central manager. In another embodiment, the plurality of event sources comprises a UDP event source, and the method further comprises an act of transmitting UDP events by the UDP event source to a UDP event receiver of the central manager. In another embodiment, the plurality of event sources comprises a TCP event source, and wherein the method further comprises an act of transmitting TCP events by the TCP event source to a TCP event receiver of the central manager. In another embodiment, the plurality of event sources comprises a file event source, and the method further comprises an act of transmitting file events by the file event source to a file event receiver of the central manager. In another embodiment, the plurality of event sources comprises a database event source, and the method further comprises an act of transmitting database events by the database event source to a database event receiver of the central manager.

According to another embodiment, the method further comprises an act of receiving, by to the event generator, a locally-committed event and streaming the locally-committed event to the central manager in real time. According to another embodiment, the one or more distributed systems are located in one or more commercial store locations, and wherein the method further comprises an act of processing, by the one or more distributed systems, events associated with transactions occurring at the one or more commercial store locations. According to another embodiment, the method further comprises an act of communicating, by the central manager, information associated with the one or more streams of transactions to one or more external systems.

According to another embodiment, the method further comprises an act of receiving, by the central manager, transactions from the one or more external systems. According to another embodiment, the method further comprises an act of updating, by the central manager, a website with real-time information associated with the one or more commercial store locations.

Still other aspects, examples, and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a to definition of the limits of a particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

DETAILED DESCRIPTION

Figure 1A:
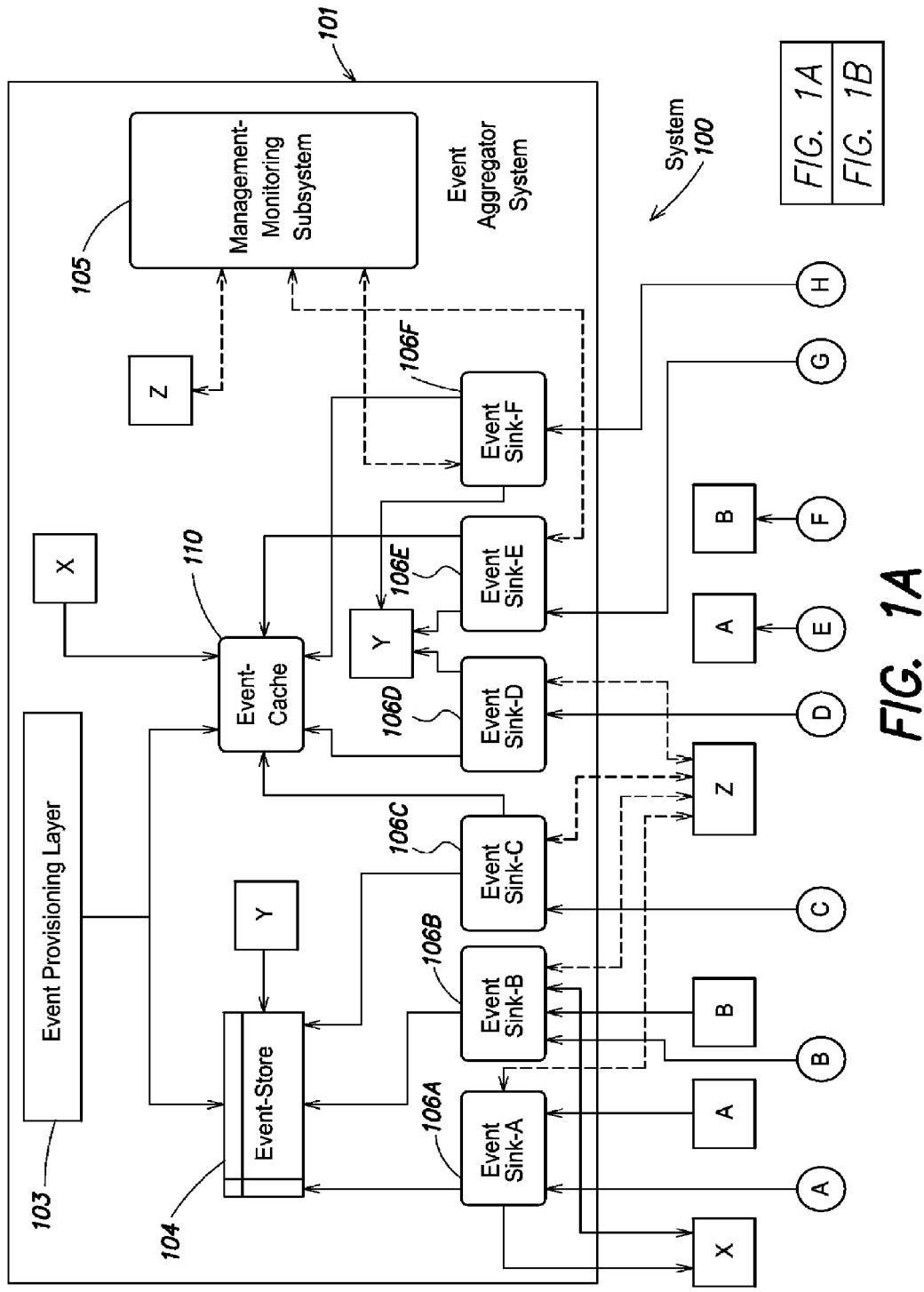
FIGS. 1A-1B are block diagrams showing a system for streaming events within a transaction-based system according to various aspects of the present invention.
Figure 1B:
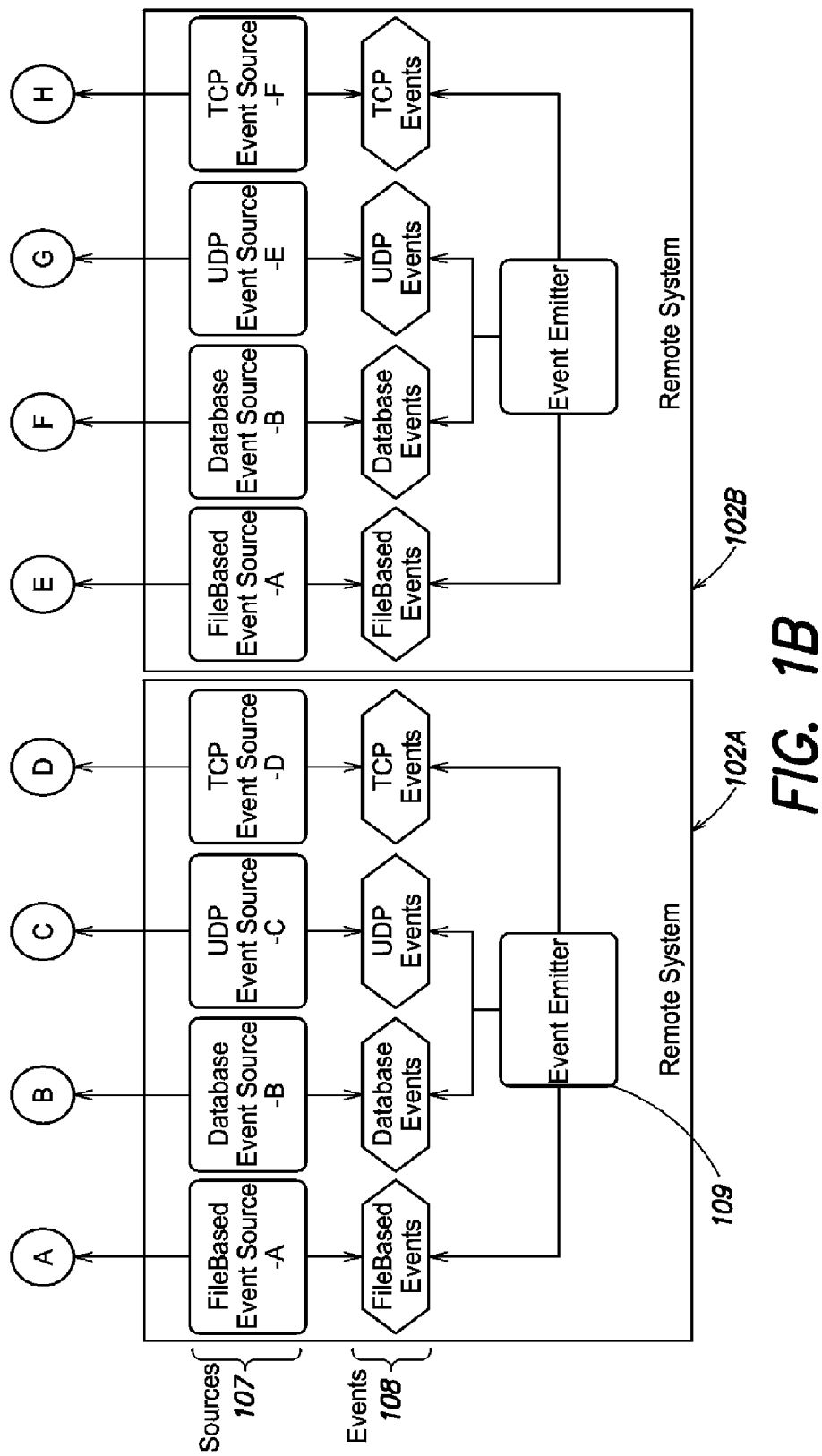

FIG. 1 shows a block diagram of a system 100 suitable for implementing various aspects of the present invention. In particular, according to various embodiments consistent with principles of the present invention, a number of constructs are provided that provide for to lightweight communication between entities within a commercial transaction system. Such lightweight communications may include for example, relatively small messages having small payloads that contain data.

System 101 (e.g., event aggregator system 101) may include one or more components including an event provisioning layer 103, an event store 104, and a management monitoring subsystem 105, and an event cache 110. The event provisioning layer is an abstraction layer that serves events on demand to one or more systems. Event store 104 is a persistent store of the event data, usually found in a central management system. Further, 101 may include one or more event sinks (e.g., event sinks A-F (items 106A-106F)) that are adapted to receive events from one or more event sources. Further, such event sinks may be configured to receive events outside of the distributed system and may be capable of transmitting events to other systems or applications.

System 101 may be coupled to one or more remote systems (e.g., remote systems 102A-102B). Such remote systems may include one or more event emitters (e.g., event emitter 109) that can generate a number of different types of events. Event emitters may include, for example, hardware, software, or combinations thereof that are capable of indicating the occurrence of a particular event. In one embodiment, an event emitter may be a small portion of code installed on the remote system that receives events as they happen in a customized transaction system (e.g., a point-of-sale (POS) system that processes transactions such as item sales at a point-of-sale location). Depending on the type of transaction and the type of systems involved, events (e.g., events 108) may be generated as file-based events, database events, UDP events or TCP events. It should be appreciated however, that other types of events may be generated and this list of events is not exhaustive. One more components may be provided on the remote system for communicating one or more event types. For instance, sources 107 may be provided that support communication of file-based events, database events, UDP events or TCP events. It should be appreciated that any number of remote systems with any number of sources can be used.

Figure 2:
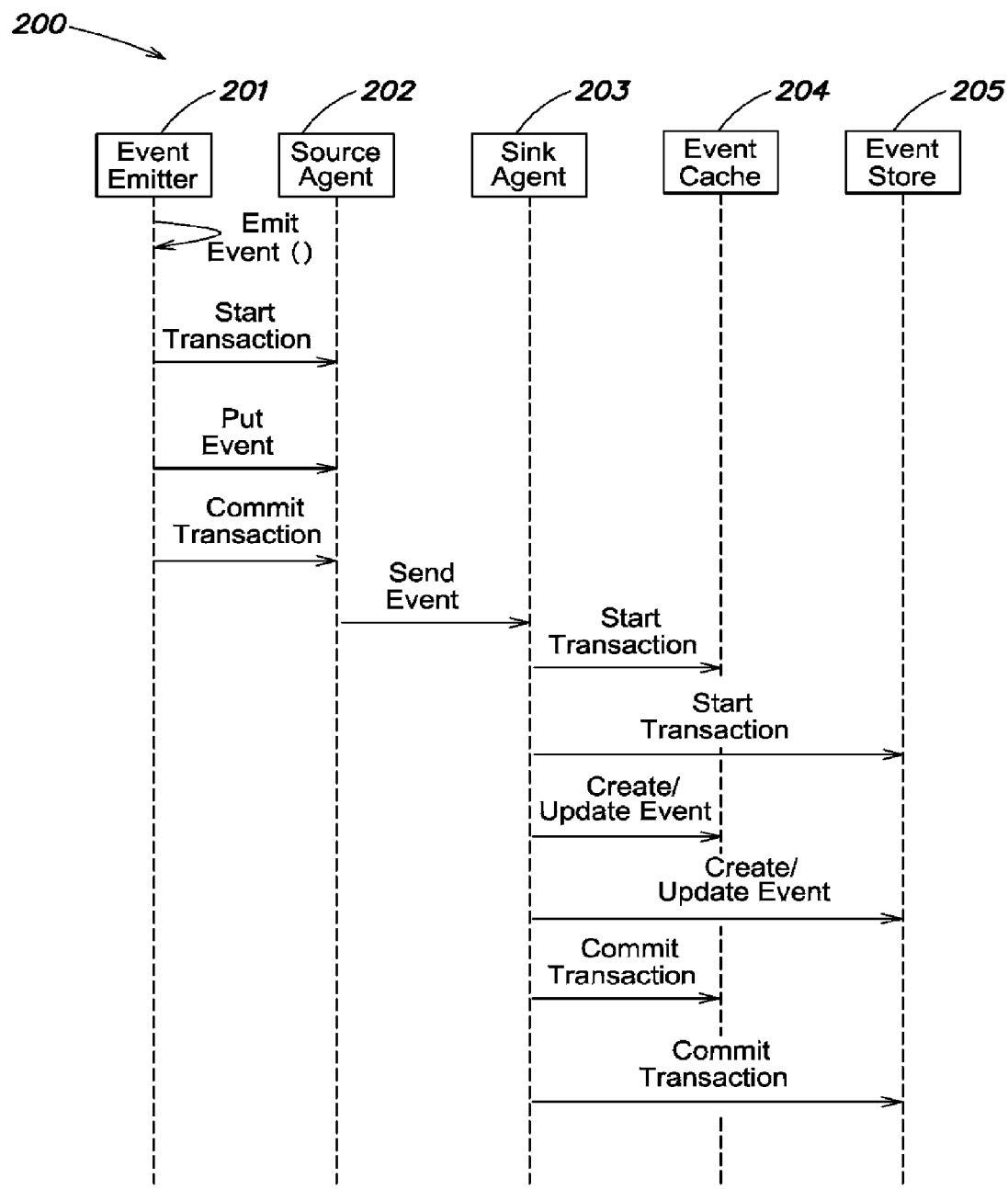
FIG. 2 shows a process for streaming events in a transaction-based system according to the to various embodiments of the present invention.

FIG. 2 shows a process 200 for streaming events in a transaction-based system according to various embodiments of the present invention. To accomplish such a process, one or more agents (e.g., a process running on the source or target) may be provided at the event source or target. An event source agent executes on the source system, and is responsible for sending events to a next destination (or "hop"). An event sink agent is a process that is used to transmit events to the destination.

To begin, an event emitter 201 emits an event to get the start of a transaction. The event is "put" to a source 202 located on the remote system. The transaction is committed at the remote system, and shortly after, the event is communicated to a sink agent 203 located on another system (e.g., an event aggregator system 101).

Agent 203 receives the event and starts committing the transaction on the other system. In one embodiment, an event cache 204 is provided that caches events on the system (e.g., system 101). The cache temporarily stores events and event data until it can be successfully relayed and/or stored in a data storage location. After receipt and potential caching, the event is transacted to an event store 205. The event store is, according to one embodiment, located in a persistent store on a host (e.g., a server, cloud-based store, or other medium).

A create/update event occurs that creates and/or updates the event in the store. Eventually, the receipt transaction is committed to long-term event storage on a central system (e.g., system 101). After that time, event data may be proliferated to other systems in a similar manner, and may be available to systems to perform various functions (e.g., an inventory function, sales estimation function, among others). Because transaction event data is communicated asynchronously by multiple sources in near real time, a snapshot of the system state any particular point in time is more accurate than a system having traditional destaged updates. Further, the central system may be capable of matriculating updated event data to external systems (e.g., a website) for the purposes of supporting Internet-based transactions with customers (e.g., sales, inventory location at particular store locations, etc.).

Figure 3:
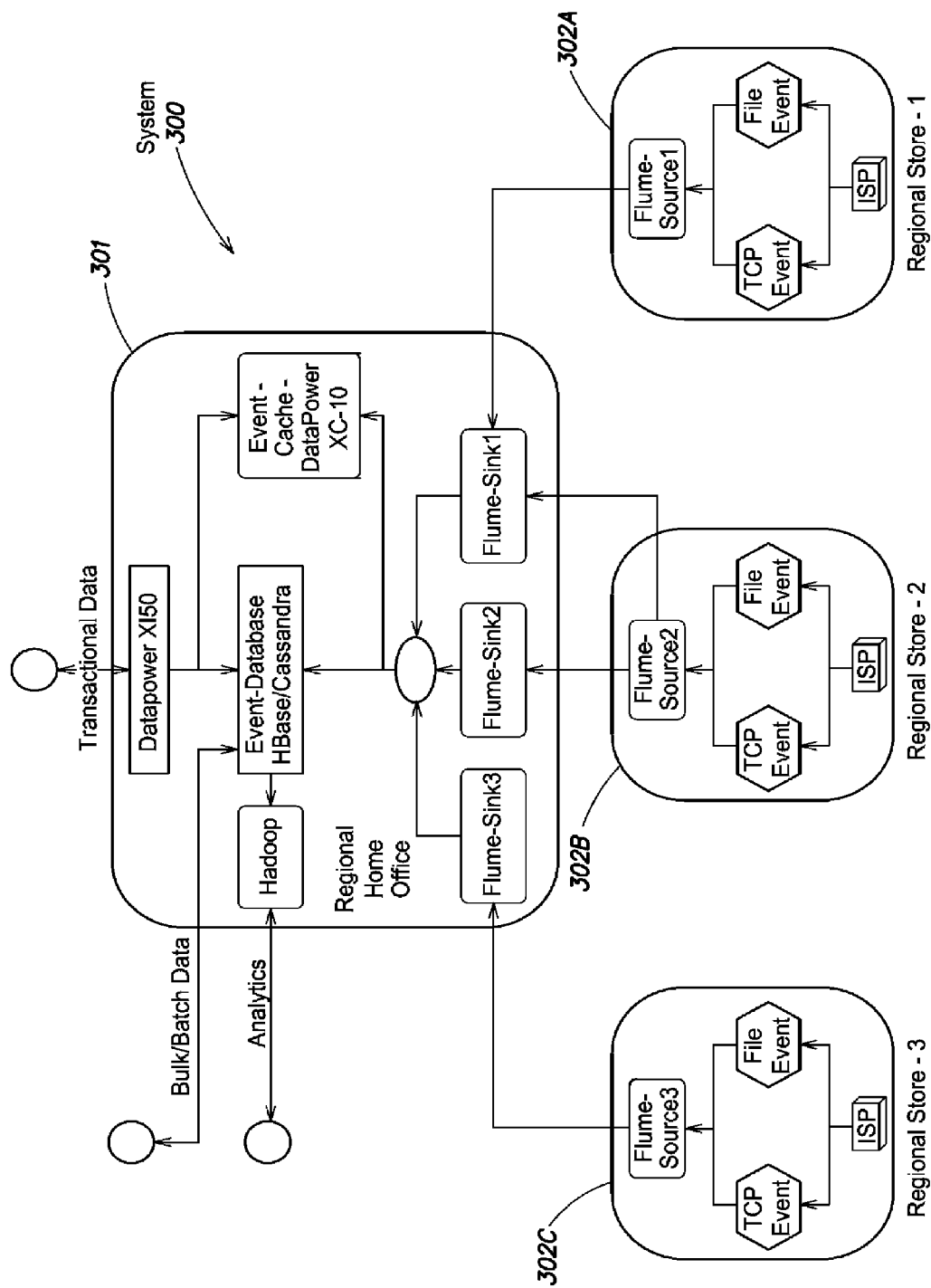
FIG. 3 shows one implementation of a distributed system including a central location and one or more regional store locations according to various embodiments of the present invention.

FIG. 3 shows one implementation of a distributed system including a central location and one or more regional store locations according to various embodiments of the present invention. For instance, a system 300 may be provided that includes a central location system 301 which is coupled to one or more regional stores (e.g., regional stores 1-3 (items 302A-302C). In one implementation, source and sink components may be implemented using the well-known Apache Flume product, which is an open source Java-based product that is capable of streaming data from multiple sources to a single source and vice versa. In another implementation, the event store located, for instance, at a regional home office may include a series of Flume-based sink processes and an event store implemented using the well-known to Cassandra open source NOSQL database. The event database may be capable of also receiving and processing bulk/batch data from other systems. At the regional home office, an Apache Hadoop HDFS system (the Hadoop Distributed File System (or HDFS)) may be used to provide high-throughput access to event data (e.g., from analytics programs or other applications/systems). Further, DataPower systems (e.g., XC-10 (security and event service layer), XI50 (event cache appliance)) may be used as a data cache, and a security and event service layer.

However, although particular commercial products are shown, it should be appreciated that other implementations may be used, and such implementations are within the spirit and scope of the present invention. For instance, the well-known SymmetricDS product may be used for asynchronous data replication of event data. Further, rather than an event-based architecture, point-to-point messaging using the well-known IBM WebSphere MQ infrastructure may be used to communicate transaction data.

Figure 4:
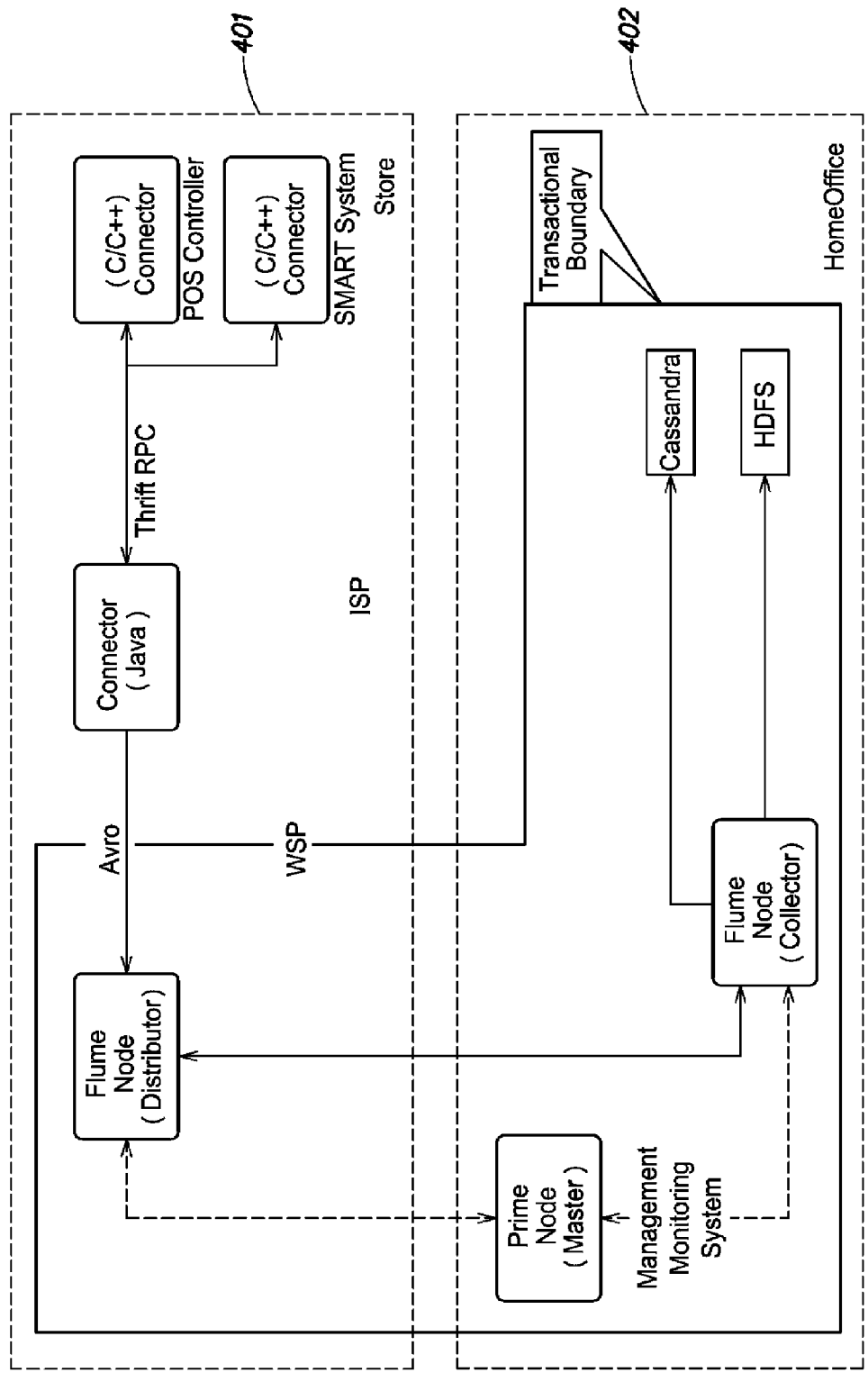
FIG. 4 shows an example implementation of a distributed system according to various embodiments of the present invention.

FIG. 4 shows an example implementation of a distributed system according to various embodiments of the present invention. In particular, FIG. 4 shows a store 401 coupled to a home office 402. Store applications may be, for example, mostly written in C, C++, or some other high-level language. The POS controller and SMART system of an ISP may include one or more C, C++ or other language connectors that communicate (e.g., using the well-known Apache Thrift rpc framework) to a connector (e.g., that may be Java-based). The Flume product may be implemented as an event distributor and may receive events from the connector using the well-known Apache Avro serialization protocol. The Flume Nodes (Event Distributor and Event Collector) may communicate event information between them, and a prime node may be provided that serves as a master event manager and monitoring system to ensure events are communicated and committed between systems. Similar to the implementation discussed above with respect to FIG. 3, system 402 may implement an event storage using the Cassandra product and may make event data available using Apache HDFS.

Figure 5:
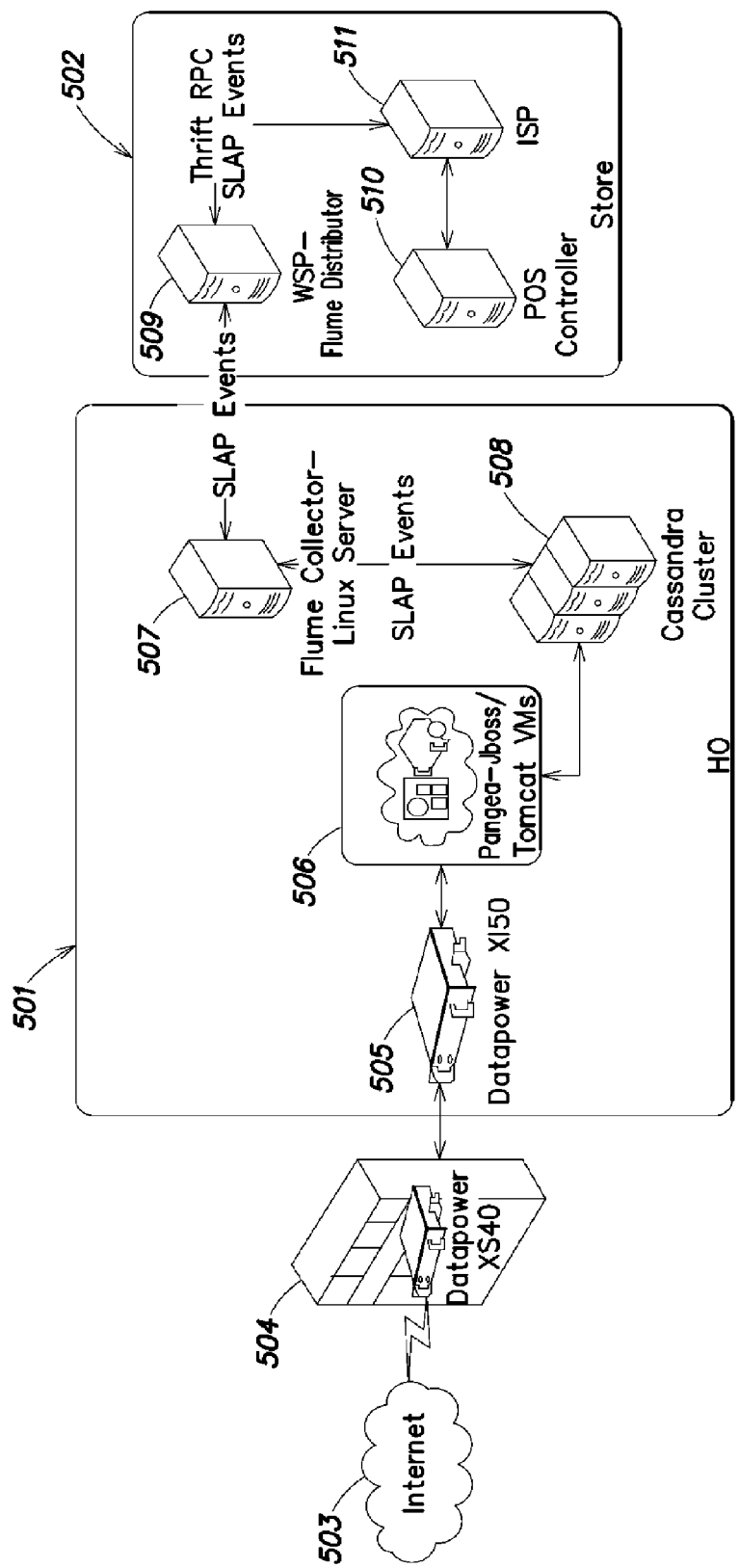
FIG. 5 shows an example system architecture of a distributed system according to one embodiment of the present invention.
Figure 6:
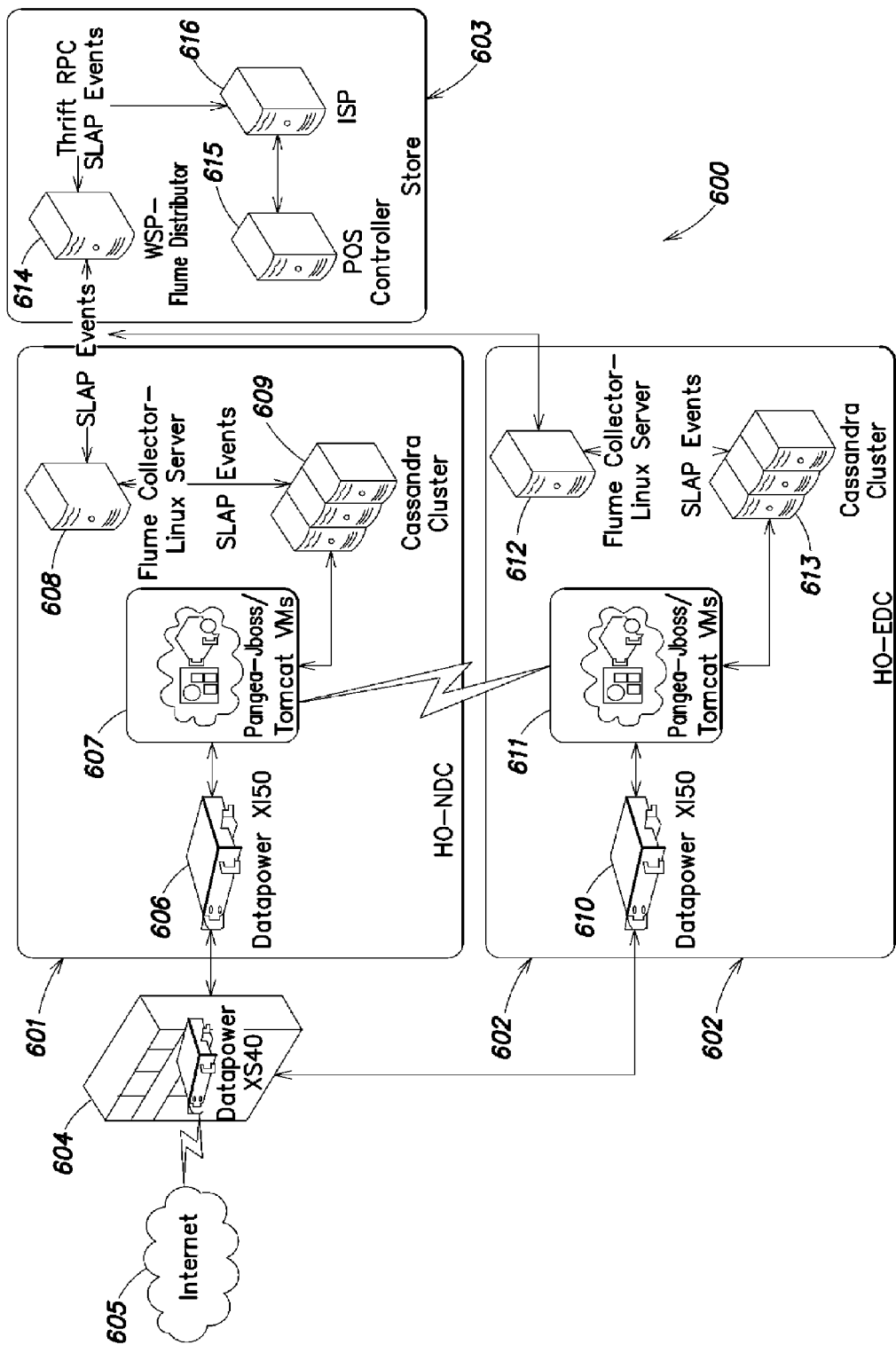
FIG. 6 shows another example of the architecture of a distributed system according to one embodiment of the present invention.

Other implementations may be performed, such as those shown in FIGS. 5 and 6. In particular, FIG. 5 shows a home office system 501 having an event cache 505 (e.g., a DataPower XI50 appliance) and an event store 506 which can be implemented on virtual machines on a clustered system 508 (e.g., a Cassandra cluster). The system may implement Flume collectors as a Linux server that collects SLAP events including event data relating to transactions. Such events may be communicated from a store location using a Flume to Distributor system 509 that in turn receives events from ISP system 511. A Point-of-Sale (POS) controller 510 initiates the event data based on a transaction conducted at the store location.

Systems located at a home office 501 could provide event data in turn to one or more external systems (e.g., via the Internet 503) through one or more systems. In one implementation, the system uses a firewall 504 coupled to the Internet (e.g., a DataPower XS40 security gateway appliance) to provide external access to event data. FIG. 6 shows a more robust implementation, using two home office implementations (601, 602), each having respective event caches (606, 610), event stores implemented on virtual machines (607, 611) on separate clusters (609,613). SLAP events may be communicated in parallel from one or more stores (e.g., store 603) to the individual home office locations. A coordination protocol may be implemented between the event store locations to ensure consistency between the event stores. Firewall 604 may also perform load sharing/failover functions by directing requests (e.g., requests provided through the Internet 605) to either home office (601, 602). Similar to store implementation 502, store implementation 603 may include a POS controller (615), ISP system (616), and Flume distributor (614) that communicates event data.

Example Computer Implementations

Processes described above are merely illustrative embodiments of systems that may be used to manage events in a distributed system. Such illustrative embodiments are not intended to limit the scope of the present invention, as any of numerous other implementations for performing the invention. None of the claims set forth below are intended to be limited to any particular implementation of an event processing system, unless such claim includes a limitation explicitly reciting a particular implementation.

Processes and methods associated with various embodiments, acts thereof and various embodiments and variations of these methods and acts, individually or in combination, may be defined by computer-readable signals tangibly embodied on a computer-readable medium, for example, a non-volatile recording medium, an integrated circuit memory element, or a combination thereof. According to one embodiment, the computer-readable medium may be non-transitory in that the computer-executable instructions may be stored permanently or semi-permanently on the medium. Such signals may define instructions, for example, as part of one to or more programs, that, as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, C#, or C++, Fortran, Pascal, Eiffel, Basic, COBOL, etc., or any of a variety of combinations thereof. The computer-readable medium on which such instructions are stored may reside on one or more of the components of a general-purpose computer described above, and may be distributed across one or more of such components.

The computer-readable medium may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

Various embodiments according to the invention may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, ARM Cortex processor, Qualcomm Scorpion processor, or any other type of processor. It should be appreciated that one or more of any type computer system may be used to partially or fully automate management of events and event data according to various embodiments of the invention. Further, the event management system may be located on a single computer or may be distributed among a plurality of computers attached by a communications network.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

A computer system may be a general-purpose computer system that is programmable using a high-level computer programming language. Computer system may be also to implemented using specially programmed, special purpose hardware. In a computer system there may be a processor that is typically a commercially available processor such as the well-known Pentium class processor available from the Intel Corporation. Many other processors are available. Such a processor usually executes an operating system which may be, for example, the Windows NT, Windows 2000 (Windows ME), Windows XP, Windows Vista, Windows 7, or Windows 8 operating systems available from the Microsoft Corporation, MAC OS X Snow Leopard, MAC OS X Lion operating systems available from Apple Computer, the Solaris Operating System available from Sun Microsystems, iOS, Blackberry OS, Windows 7 Mobile or Android OS operating systems, or UNIX available from various sources. Many other operating systems may be used.

Some aspects of the invention may be implemented as distributed application components that may be executed on a number of different types of systems coupled over a computer network. Some components may be located and executed on mobile devices, servers, tablets, or other system types. Other components of a distributed system may also be used, such as databases (e.g., the mongoDB database available from 10gen, Inc.), cloud services, or other component types.

The processor and operating system together define a computer platform for which application programs in high-level programming languages are written. It should be understood that the invention is not limited to a particular computer system platform, processor, operating system, or network. Further, it should be appreciated that multiple computer platform types may be used in a distributed computer system that implement various aspects of the present invention. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP). Certain aspects of the present invention may also be implemented on a cloud-based computer system (e.g., the EC2 cloud-based computing platform provided by Amazon.com), a distributed computer network including clients and servers, or any combination of systems.

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Further, on each of the one or more computer systems that include one or more components of distributed system 100, each of the components may reside in one or more locations on the system. For example, different portions of the components of system 100 may reside in different areas of memory (e.g., RAM, ROM, disk, etc.) on one or more computer systems. Each of such one or more computer systems may include, among other components, a plurality of known components such as one or more processors, a memory system, a disk storage system, one or more network interfaces, and one or more busses or other internal communication links interconnecting the various components.

Figure 7:
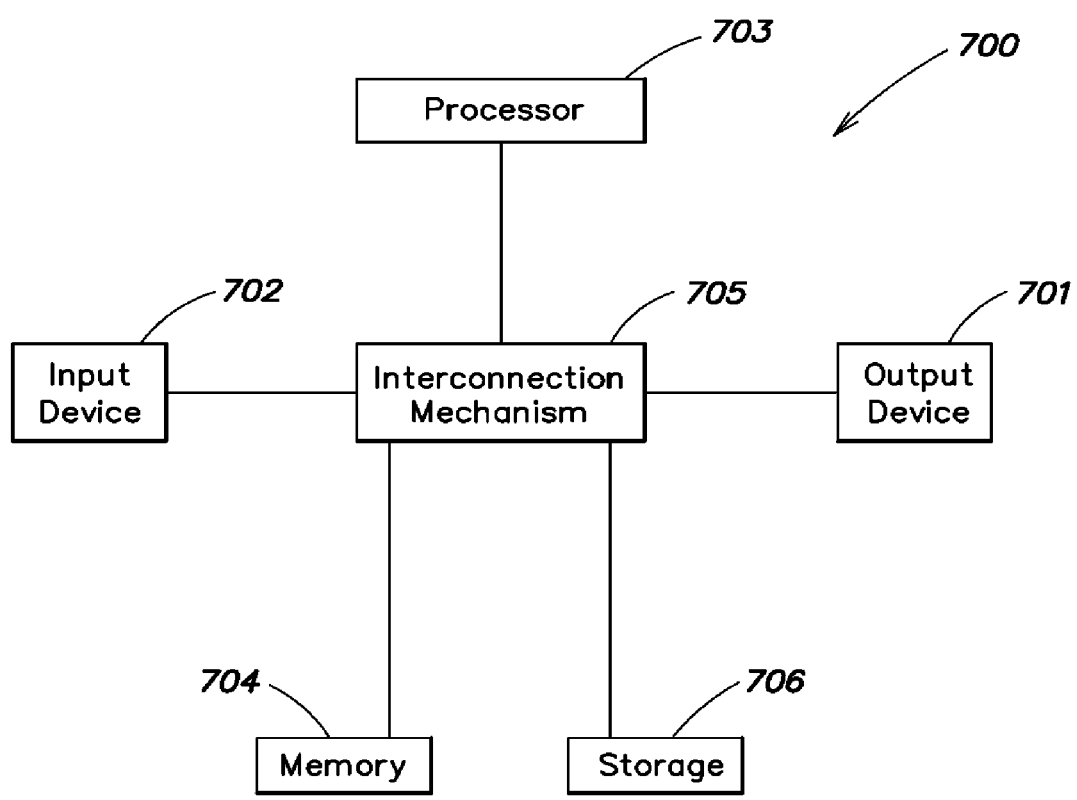
FIG. 7 shows an example computer system with which various aspects of the invention may be practiced.

Any number of systems of distributed system 100 (or other systems described above) may be implemented on a computer system described below in relation to FIGS. 7 and 8. In particular, FIG. 7 shows an example computer system 500 used to implement various aspects. FIG. 7 shows an example storage system that may be used.

System 700 is merely an illustrative embodiment of a computer system suitable for implementing various aspects of the invention. Such an illustrative embodiment is not intended to limit the scope of the invention, as any of numerous other implementations of the system, for example, are possible and are intended to fall within the scope of the invention. For example, a virtual computing platform may be used. None of the claims set forth below are intended to be limited to any particular implementation of the system unless such claim includes a limitation explicitly reciting a particular implementation.

For example, various aspects of the invention may be implemented as specialized software executing in a general-purpose computer system 700 such as that shown in FIG. 7. The computer system 700 may include a processor 703 connected to one or more memory devices 704, such as a disk drive, memory, or other device for storing data. Memory 704 is typically used for storing programs and data during operation of the computer system 700. Components of computer system 700 may be coupled by an interconnection mechanism 705, which may include one or more busses (e.g., between components that are integrated within a same machine) and/or a network (e.g., between components that reside on separate discrete machines). The interconnection mechanism 705 enables communications (e.g., data, instructions) to be exchanged between system components of system 700. Computer system 700 also includes one or more input devices 702, for example, a keyboard, mouse, scanner, trackball, microphone, touch screen, and one or more output devices 701, for example, a printing device, display screen, and/or speaker. The system may also include any specialized components depending on the application, including any barcode reader, magnetic stripe reader, receipt printer, handheld or fixed scanners, pin entry devices (PED), or other device types. In addition, computer system 700 may contain one or more interfaces (not shown) that connect computer system 700 to a communication network (in addition or as an alternative to the interconnection mechanism 705).

Figure 8:
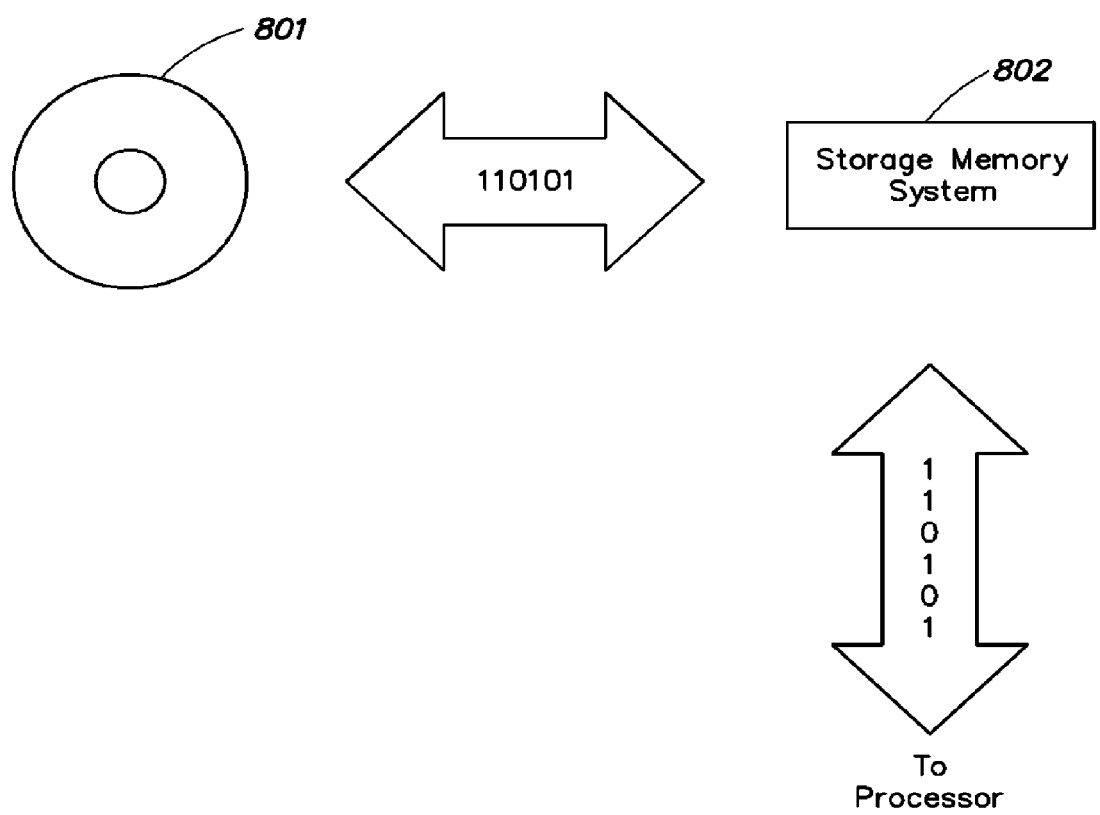
FIG. 8 shows an example storage system capable of implementing various aspects of the present invention.

The storage system 706, shown in greater detail in FIG. 8, typically includes a computer readable and writeable nonvolatile recording medium 801 in which signals are stored that define a program to be executed by the processor or information stored on or in the medium 801 to be processed by the program. The medium may, for example, be a disk or flash memory. Typically, in operation, the processor causes data to be read from the nonvolatile recording medium 801 into another memory 802 that allows for faster access to the information by the processor than does the medium 801. This memory 802 is typically a volatile, random access memory such as a dynamic random access memory (DRAM) or static memory (SRAM). It may be located in storage system 706, as shown, or in memory system to 704, not shown. The processor 703 generally manipulates the data within the integrated circuit memory 704, 802 and then copies the data to the medium 801 after processing is completed. A variety of mechanisms are known for managing data movement between the medium 801 and the integrated circuit memory element 704, 802, and the invention is not limited thereto. The invention is not limited to a particular memory system 704 or storage system 706.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 700 is shown by way of example as one type of computer system upon which various aspects of the invention may be practiced, it should be appreciated that aspects of the invention are not limited to being implemented on the computer system as shown in FIG. 7. Various aspects of the invention may be practiced on one or more computers having a different architecture or components that that shown in FIG. 7.

Computer system 700 may be a general-purpose computer system that is programmable using a high-level computer programming language. Computer system 700 may be also implemented using specially programmed, special purpose hardware. In computer system 700, processor 703 is typically a commercially available processor such as the well-known Pentium, Core, Core Vpro, Xeon, or Itanium class processors available from the Intel Corporation. Many other processors are available. Such a processor usually executes an operating system which may be, for example, the Windows NT, Windows 2000 (Windows ME), Windows XP, Windows Vista, Windows 7 or Windows 8 operating systems available from the Microsoft Corporation, MAC OS Snow Leopard, MAC OS X Lion operating systems available from Apple Computer, the Solaris Operating System available from Sun Microsystems, iOS, Blackberry OS, Windows 7 or 8 Mobile or Android OS operating systems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented using various Internet technologies such as, for example, the well-known Common Gateway Interface (CGI) script, PHP Hyper-text Preprocessor (PHP), Active Server Pages (ASP), HyperText Markup Language (HTML), Extensible Markup Language (XML), Java, JavaScript, Asynchronous JavaScript and XML (AJAX), Flash, and other programming methods. Further, various aspects of the present invention may be implemented in a cloud-based computing platform, such as the well-known EC2 platform available commercially from Amazon.com, Seattle, Wash., among others. Various aspects of the invention may be implemented as programmed or non-programmed elements, or any combination thereof.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A distributed system comprising:
one or more remote computing systems, each of the remote computing systems including an event emitter and a first processor, the first processor of at least one of the one or more remote computing systems is programmed to create, via the event emitter, one or more events based on a type of one or more transactions that occur at a location associated with the at least one of the one or more remote computing systems, determine at least one of a plurality of event sources associated with each one of the one or more events based on a type of the one or more events, route each one of the one or more events to the at least one of a plurality of event sources associated with the one or more events, commit the one or more transactions at the at least one of the one or more remote computing systems, and stream the one or more events based on the type of the one or more transactions including the one or more transactions occurring in real time from the at least one of the one or more remote computing systems over a communications network; and
a central manager comprising a second processor, one or more databases, a cache, a plurality of event sinks, each event sink of the plurality of event sinks corresponding to a different event source of the plurality of event sources, and an event receiver, the event receiver being configured to receive one or more streams of the one or more events based on the type of the one or more transactions from the one or more remote systems, route each of the one or more events to at least one event sink corresponding to the event source associated with the one or more events, temporarily store the one or more transactions in the cache, after which the second processor permanently commits the one or more transactions to the one or more databases at the central manager, and matriculates at least one of the one or more transactions to an external computer system, the second processor removing the at least one of the one or more transactions from the cache after the at least one of the one or more transactions has been permanently committed to the one or more databases and matriculated to the external computer system,
wherein the second processor permanently commits the one or more transactions to the one or more databases subsequent to the at least one of the one or more remote computing systems committing the one or more transactions.

2. The distributed system according to claim 1, wherein the streams of the one or more events are communicated to the event receiver of the central manager.

3. The distributed system according to claim 1, wherein the plurality of event sources comprises a UDP event source, the UDP event source corresponds with an UDP event sink of the central manager.

4. The distributed system according to claim 1, wherein the plurality of event sources comprises a TCP event source, the TCP event source corresponds with a TCP event sink of the central manager.

5. The distributed system according to claim 1, wherein the plurality of event sources comprises a file event source, the file event source corresponds with a file event sink of the central manager.

6. The distributed system according to claim 1, wherein the plurality of event sources comprises a database event source, the database event source corresponds with a database event sink of the central manager.

7. The distributed system according to claim 1, wherein the one or more remote computing systems are located in one or more commercial store locations, and wherein the one or more remote computing systems process events associated with transactions occurring at the one or more commercial store locations.

8. The distributed system according to claim 7, wherein the central manager communicates information associated with the one or more transactions to one or more external systems.

9. The distributed system according to claim 8, wherein the central manager receives transactions from the one or more external systems.

10. The distributed system according to claim 7, wherein the central manager updates a website with real-time information associated with the one or more commercial store location.

11. A method for processing events in a distributed system, the method comprising acts of:
creating, by a first processor of a remote computing system including an event emitter, one or more events based on a type of one or more transactions that occur at a location associated with the remote system;
determining, by the first processor, at least one of a plurality of event sources associated with each one of the one or more events based on a type of the one or more events;
routing, by the first processor, each one of the one or more events to the at least one of a plurality of event sources associated with the one or more events,
committing, by the first processor, the one or more transactions at the remote computing system
generating, by the first processor, a stream of one or more events based on the type of the one or more transactions including the one or more transactions occurring in real time from the the remote computing system over a communications network;
a second processor, one or more databases, a cache, and
receiving, by an event receiver of a central manager, the streams of one or more events based on the type of the one or more transactions from the one or more distributed systems;
routing, by the event receiver, each of the one or more events to at least one event sink of a plurality of event sinks corresponding to the event source associated with the one or more events, wherein each event sink of the plurality of event sinks corresponding to a different event source of the plurality of event sources,
temporarily storing, via the event receiver of the central manager, the one or more transactions in a cache,
subsequently permanently committing, via a second processor of the central manager, the one or more of transactions to one or more databases within the central manager, wherein the second processor committing the one or more of transactions subsequent to the first processor committing the one or more transactions at the remote computing system;
matriculating, via the second processor of the central manager, at least one of the one or more transactions to an external system;
removing, via the second processor of the central manager, the at least one of the one or more transactions from the cache after the at least one of the one or more transactions has been permanently committed to one or more databases and matriculated to the external system.

12. The method according to claim 11, further comprising communicating the streams of events to the event receiver of the central manager.

13. The method according to claim 11, wherein the plurality of event sources comprises a UDP event source, the UDP event source corresponds with an UDP event sink of the central manager.

14. The method according to claim 11, wherein the plurality of event sources comprises a TCP event source, the TCP event source corresponds with a TCP event sink of the central manager.

15. The method according to claim 11, wherein the plurality of event sources comprises a file event source, the file event source corresponds with a file event sink of the central manager.

16. The method according to claim 11, wherein the plurality of event sources comprises a database event source, the database event source corresponds with a database event sink of the central manager.

17. The method according to claim 11, wherein the remote computing system is located in one or more commercial store locations, and wherein the method further comprises an act of processing, by the remote computing system, events associated with transactions occurring at the one or more commercial store locations.

18. The method according to claim 17, further comprising an act of communicating, by the central manager, information associated with the one or more transactions to one or more external systems.

19. The method according to claim 18, further comprising an act of receiving, by the central manager, transactions from the one or more external systems.

20. The method according to claim 17, further comprising an act of updating, by the central manager, a website with real-time information associated with the one or more commercial store locations.

* * * * *

UNITED STATES PATENT AND TRADEMARK OFFICE
CERTIFICATE OF CORRECTION

PATENT NO. : 9,904,718 B2  
APPLICATION NO. : 13/886781  
DATED : February 27, 2018  
INVENTOR(S) : Varada et al.

Page 1 of 1

It is certified that error appears in the above-identified patent and that said Letters Patent is hereby corrected as shown below:

In the Claims

Column 13, Line 48:
Please replace "the the" with --the--.

Signed and Sealed this
Third Day of July, 2018

Andrei Iancu
*Director of the United States Patent and Trademark Office*